J. L. BAUDELOT.

Beer Cooler.

No. 1,265. Reissued Jan'y 28, 1862.

Witnesses:
Lemuel W. Serrell
Thos. Geo Harold.

Inventor:
J. L. Baudelot

UNITED STATES PATENT OFFICE.

HENRY MIGEON, OF WOLCOTTVILLE, CONNECTICUT, ASSIGNEE OF JEAN LOUIS BAUDELOT, OF HARANCOURT, FRANCE.

IMPROVEMENT IN PROCESS OF COOLING BEER AND OTHER LIQUIDS.

Specification forming part of Letters Patent No. 25,992, dated November 1, 1859; antedated April 13, 1856; Reissue No. 1,265, dated January 28, 1862.

DIVISION NO. 1.

*To all whom it may concern:*

Be it known that I, HENRY MIGEON, of Wolcottville, in the county of Litchfield and State of Connecticut, do hereby declare the following to be a full, clear, and exact description of an Improved Method of Cooling Beer, invented by JEAN LOUIS BAUDELOT, of Harancourt, in the Empire of France, and of whom I am assignee.

The nature of the said invention consists in the process of cooling beer by causing it to trickle in a thin film over one surface by the force of gravity, while maintained in contact with such surface by cohesive attraction, when the said surface is kept cool by the passage in the reverse direction of water or other cooling-liquid.

Figure 2:
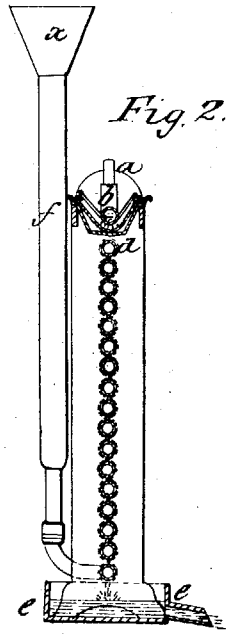
Figure 1:
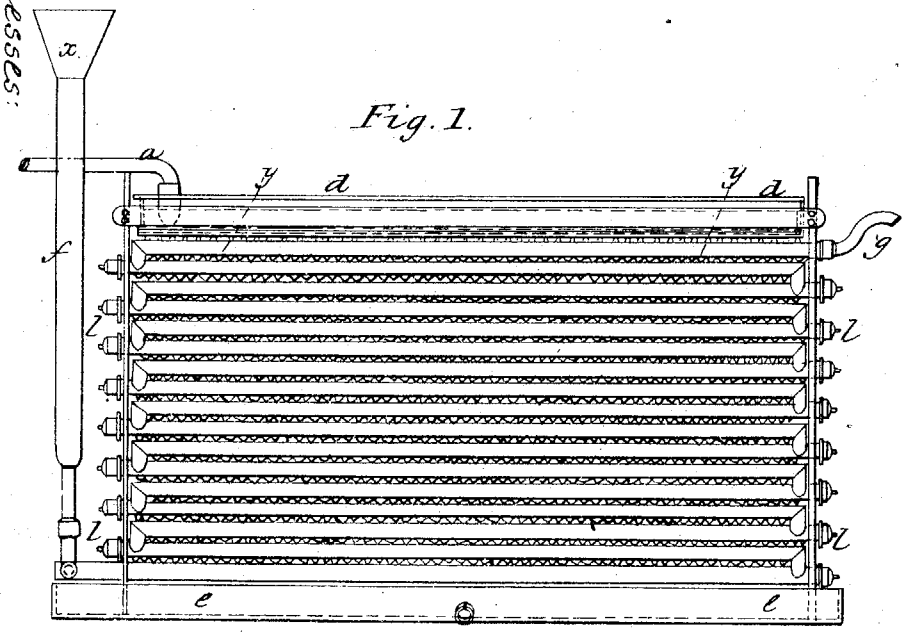

In the accompanying drawings, Figure 1 is an elevation of an apparatus adapted to perform the said process of cooling, and in Fig. 2 a vertical cross-section of the same is shown.

In these figures a vertical range of horizontal, or nearly horizontal, pipes is shown, and these pipes connect at alternate ends with the next pipe above. The lowest pipe in the range connects with the supply-pipe *f* that rises higher than the top pipe in said range, and the water or other cooling-liquid is to be supplied through this pipe from any suitable reservoir or other source; and *x* is a funnel-shaped end that may be provided to facilitate the introduction of said cooling-liquid. The upper pipe *y* of said range terminates with an elevated nozzle, *g*, from which the cooling-liquid is discharged after traveling back and forth in said vertical range of horizontal pipes.

The beer to be cooled is supplied through the pipe *a* from any suitable kettle or other vessel, and passes the entire length of the apparatus in the perforated pipe *b*, so as to distribute uniformly, and the beer passing through the said perforations falls into the trough *d*, that is perforated with a row of fine holes along the bottom, directly over the upper pipe of the said vertical range of pipes. The said trough *d* is to be provided with a screen to retain any scum, loose hops, &c., and at *c* a trough is shown within said trough *d*, with very fine wire-gauze at the bottom part thereof for the aforesaid purpose. The lower side of each pipe in the said vertical range of horizontal pipes is provided with projections, which are shown in the form of teeth, made by soldering a notched strip of metal to the under side of each pipe. These serve as conductors for the liquid falling successively from one tube to another; and at the ends of these pipes plugs should be provided, which may be removed for the purpose of clearing the pipes. *e* is a trough or receptacle for the beer as it falls from the said range of pipes.

It will now be seen that the beer in the act of traveling down the apparatus is in the form of a thin film, and that it is distributed equally along the apparatus, and also on each side of each pipe, the trough above effecting the distribution lengthwise of the apparatus, while the said teeth or projections insure the delivery upon the top of each pipe in succession, whence the beer runs around each side of the pipes equally, and the said projections allow of the pipes being placed sufficiently apart to prevent any thin film of the beer running from one pipe to the next (in consequence of its viscid nature) at any other point than along the center at the top of the pipe.

It will be seen that each and every particle of the beer to be cooled in its travel down will pass in contact with an equal portion of the cooling-surface, for the traveling film as it trickles over the cooler runs down by gravitation, but is maintained in contact with said cooler by the force of cohesive attraction, and which must act equally on each and every particle. The cooling operation thus induced will of necessity be more uniform than when the cooling is effected by the process of circulation of the beer, as when it lies on or passes over the cooling-surface in a stratum of considerable depth, and as a result of this method the beer is more uniformly and quickly cooled, and its quality improved.

What is claimed as the invention of the said JEAN LOUIS BAUDELOT is—

The process of cooling beer by causing it to trickle in a thin film along one surface of metal, as specified, while such surface is kept cool by the passage, in the reverse direction, of water or other cooling-liquid in contact with the other surface thereof, substantially as and for the purposes specified.

Dated this 10th day of January, 1862.

H. MIGEON,
*Assignee of Jean Louis Baudelot.*

Witnesses:
LEMUEL W. SERRELL,
THOS. GEO. HAROLD.